(12) United States Patent
Sato et al.

(10) Patent No.: US 8,138,302 B2
(45) Date of Patent: Mar. 20, 2012

(54) POLYARYLENE SULFIDE AND PROCESS FOR PRODUCING THE SAME

(75) Inventors: Hiroyuki Sato, Fukushima (JP);
Tatsuya Kawasaki, Tokyo (JP); Yasushi Nakazawa, Fukushima (JP)

(73) Assignee: Kureha Corporation, Tokyo (JP)

( * ) Notice: Subject to any disclaimer, the term of this patent is extended or adjusted under 35 U.S.C. 154(b) by 201 days.

(21) Appl. No.: 10/540,833

(22) PCT Filed: Dec. 19, 2003

(86) PCT No.: PCT/JP03/16332
§ 371 (c)(1),
(2), (4) Date: Jun. 23, 2005

(87) PCT Pub. No.: WO2004/060972
PCT Pub. Date: Jul. 22, 2004

(65) Prior Publication Data
US 2006/0084785 A1    Apr. 20, 2006

(30) Foreign Application Priority Data
Dec. 27, 2002    (JP) .................................. 2002-382175

(51) Int. Cl.
C08G 75/04    (2006.01)
C08G 75/00    (2006.01)
C08G 75/14    (2006.01)
(52) U.S. Cl. ................... 528/373; 528/374; 528/381
(58) Field of Classification Search ........... 528/374, 528/387
See application file for complete search history.

(56) References Cited

U.S. PATENT DOCUMENTS

| | | | | |
|---|---|---|---|---|
| 3,786,035 A | * | 1/1974 | Scoggin | 528/388 |
| 3,867,356 A | * | 2/1975 | Campbell | 528/388 |
| 4,324,886 A | * | 4/1982 | Edmonds et al. | 528/387 |
| 4,500,702 A | * | 2/1985 | Ostlinning et al. | 528/388 |
| 4,740,569 A | * | 4/1988 | Tieszen et al. | 525/537 |
| 4,761,468 A | * | 8/1988 | Okamoto et al. | 528/388 |
| 4,767,841 A | | 8/1988 | Goetz et al. | |
| 4,786,711 A | | 11/1988 | Senatore et al. | |
| 5,023,315 A | * | 6/1991 | Ceurvorst | 528/323 |
| 5,055,551 A | | 10/1991 | Schmidt et al. | |
| 5,093,469 A | * | 3/1992 | Senga | 528/388 |
| 5,280,104 A | | 1/1994 | Geibel et al. | |
| 5,306,805 A | * | 4/1994 | Arlt et al. | 528/387 |
| 5,438,115 A | * | 8/1995 | Fahey et al. | 528/388 |
| 5,744,576 A | * | 4/1998 | Miyahara et al. | 528/388 |
| 5,789,533 A | * | 8/1998 | Yamanaka et al. | 528/388 |
| 5,840,830 A | | 11/1998 | Miyahara et al. | |
| 5,945,490 A | | 8/1999 | Tsuda et al. | |
| 6,492,448 B1 | * | 12/2002 | Miyoshi et al. | 524/400 |

FOREIGN PATENT DOCUMENTS

| | | |
|---|---|---|
| EP | 0240016 | 10/1987 |
| EP | 0 280 271 A2 | 8/1988 |
| JP | 63-243133 | 10/1988 |
| JP | 63243134 | 10/1988 |
| JP | 63289025 | 11/1988 |
| JP | 02160834 | 6/1990 |
| JP | 02185527 | 7/1990 |
| JP | 02302436 | 12/1990 |
| JP | 05032782 | 2/1993 |
| JP | 05086185 | 4/1993 |
| JP | 05271414 | 10/1993 |
| JP | 07330903 | 12/1995 |
| JP | 09272801 | 10/1997 |
| JP | 09286861 | 11/1997 |
| JP | 00191785 | 7/2000 |
| JP | 2000-191785 | * 11/2000 |
| JP | 01181394 | 7/2001 |

* cited by examiner

*Primary Examiner* — Robert Loewe
(74) *Attorney, Agent, or Firm* — Porter Wright Morris & Arthur

(57) ABSTRACT

In a production process of a poly(arylene sulfide), a mixture containing an organic amide solvent, an alkali metal hydrosulfide and an alkali metal hydroxide in a proportion of 0.95 to 1.05 mol per mol of the alkali metal hydrosulfide is heated and dehydrated in a dehydration step. After the dehydration step, as needed, an alkali metal hydroxide and water are added to control the total number of moles of the alkali metal hydroxide, and the number of moles of water so as to amount to 1.00 to 1.09 per mol of a sulfur source including the alkali metal hydrosulfide existing in the system and to 0.5 to 2.0 per mol of the charged sulfur source, respectively. A polymerization step is conducted by a two-stage process.

8 Claims, No Drawings

POLYARYLENE SULFIDE AND PROCESS FOR PRODUCING THE SAME

TECHNICAL FIELD

The present invention relates to a production process of a poly(arylene sulfide) by subjecting a sulfur source and a dihalo-aromatic compound to a polymerization reaction in an organic amide solvent, and particularly to a production process of a poly(arylene sulfide), by which an alkali metal hydrosulfide and an alkali metal hydroxide can be used in combination as materials for a sulfur source to stably conduct a polymerization reaction, and polymers extremely low in the content of bis(4-chlorophenyl) sulfide that is an impurity secondarily produced upon the polymerization reaction, excellent in reactivity to silane coupling agents such as γ-aminopropyltriethoxysilane, little in volatile matter in a compound and good in color tone can be provided.

The present invention also relates to poly(arylene sulfides) low in the content of bis(4-chlorophenyl) sulfide. The present invention further relates to poly(arylene sulfides) excellent in reactivity to silane coupling agents such as γ-aminopropyltriethoxysilane.

BACKGROUND ART

Poly(arylene sulfides) (hereinafter abbreviated as "PASs") represented by poly(phenylene sulfide) (hereinafter abbreviated as "PPS") are an engineering plastics excellent in heat resistance, chemical resistance, flame retardancy, mechanical properties, electrical properties, dimensional stability and the like. The PASs are commonly used in wide fields such as electrical and electronic equipments and automotive equipments because they can be formed or molded into various kinds of molded or formed products, films, sheet, fibers, etc. by general melt processing techniques such as extrusion, injection molding and compression molding.

As a typical production process of PAS, is known a process in which a sulfur source is reacted with a dihalo-aromatic compound in an organic amide solvent such as N-methyl-2-pyrrolidone. There is known a method of using an alkali metal hydrosulfide and an alkali metal hydroxide in combination as materials for the sulfur source. However, this method is difficult to set conditions for stably performing a polymerization reaction. In addition, according to this method, difficulty is encountered on inhibition of side reactions, the content of volatile matter becomes great, and difficulty is encountered on reduction in the content of bis(4-chlorophenyl) sulfide that is an impurity due to a great amount of the alkali metal hydroxide used upon the polymerization reaction.

There has heretofore been proposed a production process of PAS, in which an alkali metal hydrosulfide, an alkali metal hydroxide and a polyhalo-aromatic compound are reacted by 2 stages (for example, Japanese Patent Application Laid-Open Nos. 2-302436 and 5-271414). In Japanese Patent Application Laid-Open No. 2-302436, it is described that the amount of the alkali metal hydroxide used is within a range of 0.7 to 1.3 mol, preferably 0.9 to 1.1 mol per mol of the alkali metal hydrosulfide. In Examples of Japanese Patent Application Laid-Open No. 2-302436, is shown an experimental example that sodium hydroxide was used in a proportion of 0.92 mol per mol of sodium hydrosulfide. Japanese Patent Application Laid-Open No. 5-271414 also disclose a like technical matter.

According to these processes, however, it is difficult to reduce the content of bis(4-chlorophenyl) sulfide and also to improve the reactivity to silane coupling agents. In addition, there is a tendency to make it difficult to stably perform a polymerization reaction and to fail to produce a high-molecular weight polymer at high yield when the molar ratio of sodium hydroxide used to sodium hydrosulfide is low as shown in Examples of these documents. Japanese Patent Application Laid-Open No. 2-302436 describes the fact that the amount of gases generated is small, but does not show analytical results as to gas compositions.

There has been proposed a production process of poly(p-phenylene) sulfide, in which a molar ratio of an alkali metal hydroxide to an alkali metal hydrosulfide is controlled to 0.80:1 to 0.98:1 to conduct polymerization by one stage (for example, Japanese Patent Publication No. 6-51792). According to this process, however, side reactions are easy to occur, difficulty is encountered on stably performing a polymerization reaction, and moreover it is also difficult to reduce the content of bis(4-chlorophenyl) sulfide and to improve the reactivity to silane coupling agents.

There has been proposed a production process of PAS, in which an alkali metal hydroxide is used in a proportion amounting to at most 1 mol per mol of an alkali metal hydrosulfide to conduct polymerization by one stage (for example, Japanese Patent Application Laid-Open No. 2001-181394). There has also been proposed a production process of PAS by one stage by using an alkali metal hydrosulfide and an alkali metal hydroxide to specify a molar ratio between the respective components (for example, Japanese Patent Application Laid-Open No. 2-160834). There has further been proposed a process for producing PAS by one stage by controlling the amount of an alkali metal hydroxide added to 0.3 to 4 mol per mol of an alkali metal hydrosulfide (for example, Japanese Patent Publication No. 6-51793). However, these processes also involve the same problems as in Japanese Patent Publication No. 6-51792.

DISCLOSURE OF THE INVENTION

It is an object of the present invention to provide a production process of a poly(arylene sulfide) extremely low in the content of bis(4-chlorophenyl) sulfide that is an impurity secondarily produced upon a polymerization reaction, excellent in reactivity to silane coupling agents such as γ-aminopropyltriethoxysilane (i.e., aminosilane), little in volatile matter in a compound and good in color tone, by which an alkali metal hydrosulfide and an alkali metal hydroxide can be used as materials for a sulfur source to stably conduct a polymerization reaction.

Another object of the present invention is to provide poly(arylene sulfides) low in the content of bis(4-chlorophenyl) sulfide. A further object of the present invention is to provide poly(arylene sulfides) excellent in reactivity to silane coupling agents such as γ-aminopropyltriethoxysilane.

The present inventors have carried out an extensive investigation with a view toward achieving the above objects. As a result, the inventors have conceived of a process comprising, in a dehydration step for controlling the amount of water in a production process of PAS by polymerizing a sulfur source and a dihalo-aromatic compound in an organic amide solvent, heating and reacting a mixture containing an alkali metal hydroxide in a proportion of 0.95 to 1.05 mol per mol of an alkali metal hydrosulfide in the organic amide solvent to dehydrate the mixture, arranging a charging step of adding an alkali metal hydroxide and water to the mixture remaining in the system after the dehydration step, as needed, to control the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration, and the number of moles of water so as to amount to 1.00 to 1.09 per mol of a sulfur source (charged sulfur source) including the alkali metal hydrosulfide existing in the system after the dehydration and to 0.5 to 2.0 per mol of the charged sulfur source, respectively, and further performing a polymerization reaction by a specific two-stage process.

The process according to the present invention has a feature in that a molar ratio between the alkali metal hydrosulfide and alkali metal hydroxide charged in the dehydration step is controlled within a limited specific range, and a proportion of the alkali metal hydroxide to 1 mol of the sulfur source is controlled within a specific limited range. Further, the process according to the present invention also has a feature in that a specific two-stage polymerization process is adopted.

According to the production process of the present invention, the polymerization reaction can be stably performed, and inconvenient reactions such as thermal decomposition are inhibited. According to the production process of the present invention, there can be provided PAS having a bis(4-chlorophenyl) sulfide content lower than 50 ppm.

According to the production process of the present invention, there can also be provided PAS excellent in reactivity to a silane coupling agent as demonstrated by a ratio (MV2/MV1) of a melt viscosity value (MV2) of the PAS after a reaction with aminosilane to a melt viscosity value (MV1) before the reaction exceeds 2.0 as measured at a temperature of 310° C. and a shear rate of 1,216 $sec^{-1}$.

According to the production process of the present invention, there can further be provided PAS which is markedly inhibited in coloring and little in volatile matter in a compound.

The present invention has been led to completion on the basis of these findings.

According to the present invention, there is provided a poly(arylene sulfide) having a bis(4-chlorophenyl) sulfide content lower than 50 ppm as determined by a gas chromatographic analysis in accordance with a measuring method specified in the description of the present application.

According to the present invention, there is also provided a poly(arylene sulfide) having a ratio (MV2/MV1) of a melt viscosity value (MV2) of the poly(arylene sulfide) after a reaction with aminosilane as specified in the description of the present application to a melt viscosity value (MV1) before the reaction exceeding 2.0 as measured at a temperature of 310° C. and a shear rate of 1,216 $sec^{-1}$.

According to the present invention, there is further provided a process for producing a poly(arylene sulfide) by polymerizing a sulfur source and a dihalo-aromatic compound in an organic amide solvent, which comprises the respective steps of:

(1) a dehydration step of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system, (2) a charging step of adding an alkali metal hydroxide and water to the mixture remaining in the system after the dehydration step, as needed, to control the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration, and the number of moles of water so as to amount to 1.00 to 1.09 per mol of a sulfur source (hereinafter referred to as "charged sulfur source") including the alkali metal hydrosulfide existing in the system after the dehydration and to 0.5 to 2.0 per mol of the charged sulfur source, respectively, (3) an first-stage polymerization step of adding a dihalo-aromatic compound to the mixture to subject the sulfur source and the dihalo-aromatic compound to a polymerization reaction at a temperature of 170 to 270° C., thereby forming a prepolymer that a conversion of the dihalo-aromatic compound is 50 to 98%, and (4) a second-stage polymerization step of controlling the amount of water in the reaction system after the first-stage polymerization step so as to bring about a state that water exists in a proportion of more than 2.0 mol, but up to 10 mol per mol of the charged sulfur source, and heating the reaction system to 245 to 290° C., thereby continuing the polymerization reaction.

BEST MODE FOR CARRYING OUT THE INVENTION

1. Sulfur Source:

In the present invention, an alkali metal hydrosulfide is used as a sulfur source. As examples of the alkali metal hydrosulfide, may be mentioned lithium hydrosulfide, sodium hydrosulfide, potassium hydrosulfide, rubidium hydrosulfide, cesium hydrosulfide and mixtures of two or more compounds thereof. The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of processing operation, weighing, etc.

In general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step.

Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous mixture such as an aqueous solution.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide, or the like.

2. Dihalo-Aromatic Compound:

The dihalo-aromatic compound used in the present invention is a dihalogenated aromatic compound having 2 halogen atoms directly bonded to the aromatic ring. Specific examples of the dihalo-aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide and dihalodiphenyl ketone.

Here, the halogen atom means each of fluorine, chlorine, bromine and iodine atoms, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.20 mol, more preferably 1.00 to 1.09 mol per mol of the sulfur source (alkali metal sulfide and/or alkali metal hydrosulfide) remaining in the system after the dehydration step.

3. Molecular Weight Control Agent, Branching or Crosslinking Agent:

In order to, for example, form a terminal of a specific structure in a PAS formed or regulate a polymerization reaction or a molecular weight, a monohalo-compound (may not be always an aromatic compound) may be used in combination. In order to form a branched or crosslinked polymer, a polyhalo-compound (may not be always an aromatic compound), to which at least 3 halogen atoms are bonded, an active hydrogen-containing halogenated aromatic compound, a halogenated aromatic nitro compound or the like may also be used in combination. A preferable example of the polyhalo-compound as a branching or crosslinking agent includes trihalobenzene.

4. Organic Amide Solvent:

In the present invention, an organic amide solvent that is an aprotic polar organic solvent is used as a solvent for the dehydration reaction and polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compound such as N-methyl-2-pyrrolidone and N-cyclohexyl-2-pyrrolidone; N,N-dialkyl-imidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkyl-pyrrolidone compounds, N-cycloalkylpyrrolidone compounds, N-alkyl-caprolactam compounds and N,N-dialkyl-imidazolidinone compounds are preferred, and N-methyl-2-pyrrolidone, N-methyl-ε-caprolactam and 1,3-dialkyl-2-imidazolidinones are particularly preferably used.

The amount of the organic amide solvent used in the polymerization reaction in the present invention is generally within a range of 0.1 to 10 kg per mol of the sulfur source.

5. Polymerization Aid:

In order to promote the polymerization reaction to obtain a PAS having a high polymerization degree in a short period of time, various kinds of polymerization aids may be used in the present invention as needed. Specific examples of the polymerization aids include metal salts of organic sulfonic acids, lithium halides, metal salts of organic carboxylic acids and alkali metal salts of phosphoric acid. Among these, metal salts of organic carboxylic acids are particularly preferred because they are cheap.

The amount of the polymerization aid used varies according to the kind of the compound used. However, it is generally within a range of 0.01 to 10 mol per mol of the charged sulfur source.

6. Dehydration Step:

A dehydration step is arranged as a preliminary step for a polymerization step to control the amount of water in the reaction system. The dehydration step is performed by a process comprising heating and reacting a mixture containing an organic amide solvent, an alkali metal hydrosulfide and an alkali metal hydroxide, desirably, under an inert gas atmosphere and discharging water outside the system by distillation.

In the present invention, the mixture containing the organic amide solvent, the alkali metal hydrosulfide and the alkali metal hydroxide in a proportion of 0.95 to 1.05 mol per mol of the alkali metal hydrosulfide is heated and reacted to discharge at least a part of a distillate containing water from the interior of the system containing the mixture to the exterior of the system.

If a molar ratio of the alkali metal hydroxide to 1 mol of the charged alkali metal hydrosulfide in this step is too small, the amount of a sulfur component (hydrogen sulfide) volatilized out in the dehydration step becomes great, which tends to incur reduction in productivity due to lowering of the amount of the charged sulfur source or cause abnormal reactions and deterioration of a PAS formed due to increase in a polysulfide component in the charged sulfur source remaining after the dehydration. If a molar ratio of the alkali metal hydroxide to 1 mol of the charged alkali metal hydrosulfide is too large, in some cases, change in properties of the organic amide solvent may be increased, difficulty may be encountered on stably performing the polymerization reaction, or the yield and quality of a PAS formed may be deteriorated. A preferable molar ratio of the alkali metal hydroxide to 1 mol of the charged alkali metal hydrosulfide in this step is 0.96 to 1.04.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for PAS even if the alkali metal hydrosulfide contains the alkali metal sulfide. However, the content thereof is preferably as low as possible for the purpose of producing a high-quality PAS according to the present invention. Even when a small amount of the alkali metal sulfide is mixed in, the molar ratio to the alkali metal hydroxide is calculated out on the basis of the content (analytical value) of the alkali metal hydrosulfide in the present invention to regulate the molar ratio.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the water content in the polymerization reaction system is reduced to 0.5 to 2.0 mol per mol of the sulfur source. When the water content has become too low in the dehydration step, water may be added prior to the polymerization step to regulate the water content to a desired value.

The charging of these raw materials into a reaction vessel is conducted within a temperature range of generally from ordinary temperature (5 to 35° C.) to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred.

The amount of the organic amide solvent used is generally about 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system thereof.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

In the dehydration step, it is considered that the alkali metal hydroxide reacts with the organic amide solvent by the heat treatment to form an alkali metal alkylaminoalkanoate, and the alkali metal hydrosulfide exists in the system in the form of a complex with the alkali metal alkylaminoalkanoate. On the other hand, a part of the alkali metal hydrosulfide reacts with water to form hydrogen sulfide and an alkali metal hydroxide, and the hydrogen sulfide formed is discharged outside the system. The discharge of hydrogen sulfide outside the system is directly linked with the weight loss of the sulfur source in the system. Accordingly, it is important to measure the amount of hydrogen sulfide volatilized out in the dehydration step to exactly calculate out the amount of the sulfur source remaining in the system in that a molar ratio to the alkali metal hydroxide or dihalo-aromatic compound is regulated.

7. Charging Step:

In the present invention, as needed, an alkali metal hydroxide and water are added to the mixture remaining in the system after the dehydration step to control the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration so as to amount to 1.00 to 1.09 per mol of the sulfur source (charged sulfur source) including the alkali metal hydrosulfide existing in the system after the dehydration and the number of moles of water so as to amount to 0.5 to 2.0 per mol of the charged sulfur source, respectively.

Here, the amount of the charged sulfur source is calculated out in accordance with an equation, [Charged sulfur source]=[Total moles of sulfur charged]−[Moles of sulfur volatilized out after dehydration].

When hydrogen sulfide is volatilized out in the dehydration step, an alkali metal hydroxide is formed by an equilibrium reaction and comes to remain in the system. Accordingly, it is necessary to exactly grasp these amounts to determine a molar ratio of the alkali metal hydroxide to the sulfur source in the charging step.

If the molar ratio of the alkali metal hydroxide to 1 mol of the sulfur source is too high, change in properties of the organic amide solvent may be increased, or abnormal reactions or decomposition reactions tend to occur upon polymerization. In addition, the lowering of the yield and quality of a PAS formed is often caused. The molar ratio of the alkali metal hydroxide to 1 mol of the sulfur source is preferably 1.01 to 1.08 mol, more preferably 1.015 to 1.075 mol. It is preferred to conduct the polymerization reaction slightly in excess of the alkali metal hydroxide in that the polymerization reaction is stably performed to obtain a high-quality PAS.

8. Polymerization Step:

The polymerization step is conducted by charging a dihalo-aromatic compound into the mixture after completion of the dehydration step and heating the sulfur source and the dihalo-aromatic compound in an organic amide solvent. When another polymerization vessel than the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and both components are charged in small portions or at a time.

The polymerization reaction is generally conducted by a two-stage process at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, desirably from 30 minutes to 48 hours. The amount of the organic amide solvent used in the polymerization step is within a range of generally from 0.1 to 10 kg, preferably from 0.15 to 1 kg per mol of the charged sulfur source existing in the polymerization step. The amount may be changed in the course of the polymerization reaction so far as it falls within this range.

The water content upon the beginning of the polymerization reaction is controlled within a range of 0.5 to 2.0 mol per mol of the charged sulfur source. It is preferable to increase the water content in the course of the polymerization reaction.

In the production process according to the present invention, the polymerization reaction is conducted in the polymerization step by an at least two-stage polymerization process comprising:

(1) a first-stage polymerization step of heating a reaction mixture containing the organic amide solvent, the sulfur source, the dihalo-aromatic compound and the alkali metal hydroxide of the specified molar ratio to 170 to 270° C. in the presence of water in an amount of 0.5 to 2.0 mol per mol of the charged sulfur source to conduct a polymerization reaction, thereby forming a prepolymer that a conversion of the dihalo-aromatic compound is 50 to 98%, and (2) a second-stage polymerization step of controlling the amount of water in the reaction system so as to bring about a state that water exists in a proportion of more than 2.0 mol, but up to 10 mol per mol of the charged sulfur source, and heating the reaction system to 245 to 290° C., thereby continuing the polymerization reaction.

In the first-state polymerization step, it is desirable to form a prepolymer having a melt viscosity of 0.5 to 30 Pa·s as measured at a temperature of 310° C. and a shear rate of 1,216 $sec^{-1}$.

Water may be added at a second stage of the polymerization reaction or upon completion thereof to increase the water content for the purpose of lowering the contents of common salt secondarily produced and impurities in the polymer formed or collecting the polymer in the form of particles. The polymerization reaction system may be a batch system, a continuous system or a combination of both systems. In the batch-wise polymerization, 2 or more reaction vessels may be used for the purpose of shortening the polymerization cycle time.

9. Post Treatment Step:

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly, whereby PAS can be collected. According to the production process of the present invention, a granular polymer can be formed, so that the granular polymer is preferably separated from the reaction mixture by a method of sieving the polymer by means of a screen because the polymer can be easily separated from by-products, oligomers, etc. The product slurry may be subjected to sieving as it is in a high-temperature state, thereby collecting the polymer.

After the separation (sieving) by filtration, the PAS is preferably washed with the same organic amide solvent as the polymerization solvent, or an organic solvent such as a ketone (for example, acetone) or an alcohol (for example, methanol). The PAS may be washed with hot water. The PAS formed may also be treated with an acid or a salt such as ammonium chloride.

10. PAS:

According to the production process of the present invention, there can be provided a PAS having a bis(4-chlorophenyl) sulfide content lower than 50 ppm, preferably not higher than 40 ppm, more preferably not higher than 30 ppm as determined in accordance with a measuring method (described in Examples) specified in the description of the present application. When the bis(4-chlorophenyl) sulfide content amounts to at least 50 ppm, the volatile matter content becomes excessive when a compound making use of such a PAS is injection-molded, so that the resulting molded product tends to cause defects at its appearance, or the amount of impurities attached to a mold increases to markedly lower workability upon molding and processing. In the present invention, ppm is based on the weight.

According to the production process of the present invention, there can also be provided a PAS having a ratio (MV2/MV1) of a melt viscosity value (MV2) of the PAS after a reaction (described in Examples) with aminosilane (i.e., γ-aminopropyltriethoxysilane) as specified in the description of the present application to a melt viscosity value (MV1) before the reaction of higher than 2.0, preferably at least 2.1 as measured at a temperature of 310° C. and a shear rate of 1,216 $sec^{-1}$. The upper limit of this ratio is generally about 3.0. A higher ratio indicates that the reactivity of the PAS to a silane coupling agent is higher.

When the reactivity to aminosilane is high, a viscosity in a molten state of a composition composed of the PAS and aminosilane becomes high, the relation of the viscosity to the shear rate differs from PAS alone, such effects that occurrence of burr in melt molding is reduced are brought about, and selection latitude of melt processing conditions can be widened. If MV2/MV1 is lower than 2, such a polymer tends to lessen the effect to develop such properties. When the production process of PAS according to the present invention is used, MV2/MV1 may also be stabilized. When MV2/MV1 varies, the melt viscosity of a composition comprising such a PAS and aminosilane tends to vary. Thus, such a polymer is not preferred. Accordingly, it is desirable to control the ratio within a fixed range, and the present invention can also meet the requirement.

The PAS obtained by the production process according to the present invention is good in color tone, and its yellow index (YI) is generally at most 10, preferably at most 8, more preferably at most 7, often within a range of 5 to 6. A compound of the PAS obtained by the production process according to the present invention is little in the amount of volatile matter generated and is also suitable for use in fields of electronic equipments and the like, in which inhibition of volatile matter is desired.

After the second-stage polymerization step, the PAS according to the present invention, which is obtained by collecting from the reaction mixture, has a melt viscosity higher than the melt viscosity of the prepolymer obtained in the first-stage polymerization step as measured at a temperature of 310° C. and a shear rate of 1,216 $sec^{-1}$. No particular limitation is imposed on the melt viscosity (temperature: 310° C., shear rate: 1,216 $sec^{-1}$) of the PAS according to the present invention. However, it is within a range of preferably from 30 to 800 Pa·s, more preferably from 40 to 500 Pa·s.

The PAS obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins, if desired, as it is or after oxidized and crosslinked. The PAS is particularly preferably PPS.

EXAMPLES

The present invention will hereinafter be described more specifically by the following Examples and Comparative Examples. Physical properties and the like were measured in accordance with the following respective methods.

(1) Yield:

Assuming that all the available sulfur component existing in a reaction vessel after a dehydration step was converted to a polymer, the weight (theoretical amount) of that polymer was used as a reference value to calculate out a proportion (% by weight) of the weight of a polymer actually collected to the reference value as a yield of the polymer.

(2) Melt Viscosity:

A melt viscosity was measured by using about 20 g of a dry polymer by means of Capirograph 1-C (manufactured by Toyo Seiki Seisakusho, Ltd.). At this time, a flat die of 1 mm in diameter and 10 mm in length was used as a capillary, and the temperature was set to 310° C. After the polymer sample was placed in the apparatus and held for 5 minutes, the melt viscosity was measured at a shear rate of 1,216 $sec^{-1}$.

(3) Color Tone (Yellow Index):

A polymer was pressed under 15 MPa for 1 minute by means of an electric power press to prepare tablets. The tablets were used as a measurement sample to measure a color tone by means of TC-1800 (manufactured by Tokyo Denshoku Gijutsu Center) in accordance with a reflected light measuring method under conditions of standard light C, a visual field of 2° and a calorimetric system. Prior to the measurement, the apparatus was calibrated by a standard white plate. The measurement was conducted at 3 points as to each sample, and an average value thereof was calculated out. The color tone was indicated by a yellow index (YI) value.

(4) Reactivity of Polymer:

To 100 parts by weight of a polymer was added 0.8 parts by weight of γ-aminopropyltriethoxysilane (hereinafter abbreviated as "aminosilane"), and they were well blended. Thereafter, 20 g of the blend was taken out to measure a melt viscosity value thereof under the same melt viscosity measuring conditions as described above. The reactivity of the polymer was indicated by a ratio to a melt viscosity value of the polymer, to which no aminosilane was added, under the same conditions. In other words, the reactivity of the polymer was evaluated by a ratio [(MV2)/(MV1); increase ratio of melt viscosity] of the melt viscosity value (MV2) of the blend of the polymer and aminosilane to the melt viscosity value (MV1) of the polymer. A higher ratio indicates that the reactivity of the polymer is higher.

(5) Determination of Bis(4-Chlorophenyl) Sulfide:

In a NEG tube (10 mm in diameter×75 mm) is taken 30 mg of a dry polymer, and the tube is set in a Curie point head space sampler of JHS-100 (manufactured by Japan Analytical Industry Co., Ltd.). The apparatus is heated at 180° C. for 30 minutes and at 330° C. for 15 minutes to cause volatile matter to pass through a trap vessel with built-in glass wool at 40° C. under a helium stream, thereby adsorbing and collecting it. The trap vessel is then cooled to room temperature and further heated at 360° C. for 10 seconds to desorb the volatile matter, which is subjected to gas chromatographic analysis using helium gas as it is, thereby determining a volatile component.

<Conditions of Gas Chromatographic Analysis>

Apparatus: Hitachi G-3000,
Temperature of vaporizing chamber: 300° C.,
Column: HP-5 [0.32 mm in diameter×25 m; df (film thickness)=0.25 μm],
Column temperature: After holding at 60° C. for 5 minutes, raising the temperature to 300° C. at a heating rate of 8° C./min and holding at that temperature for 10 minutes,
Detector: FID (flame thermionic detector), 310° C.
Carrier gas: Helium, 2.5 ml/min,
Split ratio: 1/14.6, and
Determination: Determined from a calibration curve using bis(4-chlorophenyl) sulfide synthesized.

(6) Volatilized Deposit Component of Compound:

After 60% by weight of a dry polymer, 39.8% by weight of a fibrous filler (glass fiber having a diameter of 13 μm) and 0.2% by weight of a lubricant were mixed for 5 minutes, the resultant mixture was melted and kneaded by a twin-screw extruder the cylinder temperature of which was 320° C., thereby preparing pellets. Ten grams of the pellets thus prepared were weighed and taken in a test tube having a diameter of 10 mm. A piece of SKD11 metal of 8-mm square (thickness: 2 mm) was placed on a stack of the pellets, and the test tube was sealed with a silicon stopper. The test tube was then put in an aluminum block bath and heated at 340° C. for 4 hours. A volatilized deposit on the metal piece before and after the test was visually observed to make a judgment in accordance with the following standard.

A: No deposit is observed,
B: Deposit is extremely slightly observed,
C: Deposit is observed, and
D: Deposit is markedly observed.

Example 1

1. Dehydration Step

A 20-liter autoclave (reactor) made of titanium was charged with 2,000 g of an aqueous solution [sulfur (S) content: 22.43 mol; analytical value of NaSH by a neutralization titration method: 61.48% by weight (21.93 mol); sodium sulfide ($Na_2S$) content: 0.50 mol] of sodium hydrosulfide (NaSH) having an analytical value of 62.87% by weight by means of iodimetry, 1,200 g of a 74.69% by weight aqueous solution (NaOH content: 22.41 mol) of sodium hydroxide (NaOH) and 6,700 g of N-methyl-pyrrolidone (hereinafter abbreviated as "NMP"). Assuming that a sulfur source composed of sodium hydrosulfide and sodium sulfide is indicated as "S", NaOH/NaSH before dehydration is 1.02 (mol/mol), and NaOH/S is 1.00 (mol/mol).

After purged with nitrogen gas, the contents were gradually heated to 200° C. over 3.5 hours with stirring to distill off 940.0 g of water and 1589.6 g of NMP. At this time, 0.31 mol of hydrogen sulfide ($H_2S$) was volatilized out. Accordingly, an available S content in the reactor after the dehydration step was 22.12 mol. The amount of $H_2S$ volatilized out corresponded to 1.39 mol % based on the charged S content.

2. Charging Step

After the dehydration step, the reactor containing 22.12 mol of the available S was cooled to 150° C., 3,299 g [p-dichlorobenzene (hereinafter abbreviated as "pDCB")/available S=1.015 (mol/mol)] of pDCB, 3,736 g of NMP and 118 g [total water content in the reactor/available S=1.50 (mol/mol)] of water were added, and 8.2 g of NaOH having a purity of 97% was added in such a manner that (NaOH in the reactor/available S) is 1.05 (mol/mol). NaOH (0.62 mol) formed by volatilization of $H_2S$ is contained in the reactor.

3. Polymerization Step

While a stirrer installed in the reactor was operated at 250 rpm, a reaction was conducted at 220° C. for 1 hour, and the reaction mixture was then heated to 230° C. over 30 minutes to conduct a reaction at 230° C. for 1.5 hours (first-stage polymerization step). Thereafter, the number of revolutions of the stirrer was increased to 400 rpm, 517.5 g of water was charged under pressure [total water content in the reactor/available S=2.80 (mol/mol)] while continuing the stirring, and the contents were heated to 260° C. to conduct a reaction for 5.0 hours (second-stage polymerization step).

4. Post Treatment Step

After completion of the reaction, the reaction mixture was cooled near to room temperature, and the reaction mixture was sifted through a screen of 100 mesh to collect a granular polymer. The thus-separated polymer was washed twice with acetone and additionally 3 times with water to obtain a washed polymer. This washed polymer was immersed in a 0.6% by weight aqueous solution of acetic acid to treat the polymer at 40° C. for 40 minutes, and the thus-treated polymer was then washed with water. The granular polymer was dried at 105° C. for 3 hours. The yield of the granular polymer thus obtained was 90%, and its melt viscosity was 145 Pa·s. The polymerization conditions and the measured results of physical properties are shown in Tables 1 and 2.

Example 2

Charging was conducted in the same manner as in Example 1 except that the amount of the aqueous solution of sodium hydroxide (NaOH) charged was changed from 1,200 g to 1,150 g. Accordingly, NaOH/NaSH before dehydration was 0.98 (mol/mol), and NaOH/S is 0.96 (mol/mol). In the dehydration step, dehydration was conducted under the same conditions as in Example 1. As a result, 935.0 g of water and 1567.3 g of NMP were distilled off, and 0.34 mol of $H_2S$ was volatilized out. The available S content in the reactor after the dehydration step was 22.09 mol. The amount of $H_2S$ volatilized out corresponded to 1.52 mol % based on the charged S content.

Thereafter, 3,296 g [pDCB/available S=1.015 (mol/mol)] of pDCB, 3,703 g of NMP, 125.7 g [total water content in the reactor/available S=1.50 (mol/mol)] of water and 15.8 g [NaOH in the reactor/available S=1.02 (mol/mol)] of NaOH having a purity of 97% were added in the same manner as in Example 1 to conduct first-stage polymerization. Subsequently, 516.9 g of water was charged under pressure [total water content in the reactor/available S=2.80 (mol/mol)] to conduct second-stage polymerization. After completion of the polymerization, a polymer was collected in the same manner as in Example 1. The yield of the granular polymer thus obtained was 90%, and its melt viscosity was 125 Pa·s. The polymerization conditions and the measured results of physical properties are shown in Tables 1 and 2.

Example 3

Charging was conducted in the same manner as in Example 1 except that the amount of the aqueous solution of sodium hydroxide (NaOH) charged was changed from 1,200 g to 1,220 g. Accordingly, NaOH/NaSH before dehydration was 1.04 (mol/mol), and NaOH/S is 1.02 (mol/mol). In the dehydration step, dehydration was conducted under the same conditions as in Example 1. As a result, 935.2 g of water and 1595.0 g of NMP were distilled off, and 0.31 mol of $H_2S$ was volatilized out. The available S content in the reactor after the dehydration step was 22.05 mol. The amount of $H_2S$ volatilized out corresponded to 1.69 mol % based on the charged S content.

Thereafter, 3,274 g [pDCB/available S=1.010 (mol/mol)] of pDCB, 3,715 g of NMP, 108.5 g [total water content in the reactor/available S=1.50 (mol/mol)] of water and 15.6 g [NaOH in the reactor/available S=1.075 (mol/mol)] of NaOH having a purity of 97% were added in the same manner as in Example 1 to conduct first-stage polymerization while continuously heating the contents from 220° C. to 260° C. over 1.5 hours. Subsequently, 516.0 g of water was charged under pressure [total water content in the reactor/available S=2.80 (mol/mol)] to conduct second-stage polymerization. After completion of the polymerization, a polymer was collected in the same manner as in Example 1. The yield of the granular polymer thus obtained was 88%, and its melt viscosity was 110 Pa·s. The polymerization conditions and the measured results of physical properties are shown in Tables 1 and 2.

Comparative Example 1

Charging was conducted in the same manner as in Example 1 except that the amount of the aqueous solution of sodium hydroxide (NaOH) charged was changed from 1,200 g to 1,000 g. Accordingly, NaOH/NaSH before dehydration was 0.85 (mol/mol), and NaOH/S is 0.83 (mol/mol). In the dehydration step, dehydration was conducted under the same conditions as in Example 1. As a result, 965.8 g of water and 1513.5 g of NMP were distilled off, and 0.40 mol of $H_2S$ was volatilized out. The available S content in the reactor after the dehydration step was 22.03 mol. The amount of $H_2S$ volatilized out corresponded to 1.78 mol % based on the charged S content.

Thereafter, 3,287 g of pDCB and 3,625 g of NMP were added in such a manner that (pDCB/available S) is 1.015 (mol/mol), 195.0 g of water was added in such a manner that (total water content in the reactor/available S) is 1.50 (mol/mol), and 10.6 g of NaOH having a purity of 97% was added in such a manner that (NaOH in the reactor/available S) is 0.90 (mol/mol), thereby conducting first-stage polymerization in the same manner as in Example 1. Subsequently, 515.5 g of water was charged under pressure in such a manner that (total water content in the reactor/available S) is 2.80 (mol/mol), thereby conducting second-stage polymerization. After completion of the polymerization, a reaction product was decomposed, and so no polymer was collected. The polymerization conditions and the results are shown in Tables 1 and 2.

Comparative Example 2

Charging was conducted in the same manner as in Example 1 except that the amount of the aqueous solution of sodium hydroxide (NaOH) charged was changed from 1,200 g to 1,080 g. Accordingly, NaOH/NaSH before dehydration was 0.92 (mol/mol), and NaOH/S is 0.90 (mol/mol). In the dehydration step, dehydration was conducted under the same conditions as in Example 1. As a result, 944.4 g of water and 1545.3 g of NMP were distilled off, and 0.38 mol of $H_2S$ was volatilized out. The available S content in the reactor after the dehydration step was 22.05 mol. The amount of $H_2S$ volatilized out corresponded to 1.69 mol % based on the charged S content.

Thereafter, 3,290 g of pDCB and 3,665 g of NMP were added in such a manner that (pDCB/available S) is 1.015 (mol/mol), 153.1 g of water was added in such a manner that (total water content in the reactor/available S) is 1.50 (mol/mol), and 41.5 g of NaOH having a purity of 97% was added in such a manner that (NaOH in the reactor/available S) is 1.0 (mol/mol), thereby conducting first-stage polymerization in the same manner as in Example 1. Subsequently, 516.0 g of water was charged under pressure in such a manner that (total water content in the reactor/available S) is 2.80 (mol/mol), thereby conducting second-stage polymerization. After completion of the polymerization, a polymer was collected in the same manner as in Example 1. The yield of the granular polymer thus obtained was 90%, and its melt viscosity was 90 Pa·s. The polymerization conditions and the measured results of physical properties are shown in Tables 1 and 2.

Comparative Example 3

Charging was conducted in the same manner as in Example 1 except that the amount of the aqueous solution of sodium hydroxide (NaOH) charged was changed from 1,200 g to 1,220 g. Accordingly, NaOH/NaSH before dehydration was 1.04 (mol/mol), and NaOH/S is 1.02 (mol/mol). In the dehydration step, dehydration was conducted under the same conditions as in Example 1. As a result, 930.3 g of water and 1590.7 g of NMP were distilled off, and 0.44 mol of $H_2S$ was volatilized out. The available S content in the reactor after the dehydration step was 21.99 mol. The amount of $H_2S$ volatilized out corresponded to 1.96 mol % based on the charged S content.

Thereafter, 3,281 g of pDCB and 3,687 g of NMP were added in such a manner that (pDCB/available S) is 1.015 (mol/mol), 104.1 g of water was added in such a manner that (total water content in the reactor/available S) is 1.50 (mol/mol), and 19.5 g of NaOH having a purity of 97% was added in such a manner that (NaOH in the reactor/available S) is 1.100 (mol/mol), thereby conducting first-stage polymerization in the same manner as in Example 1. Subsequently, 514.6 g of water was charged under pressure in such a manner that (total water content in the reactor/available S) is 2.80 (mol/mol), thereby conducting second-stage polymerization. After completion of the polymerization, a polymer was collected in the same manner as in Example 1. The yield of the granular polymer thus obtained was 70%, and its melt viscosity was 90 Pa·s. The polymerization conditions and the measured results of physical properties are shown in Tables 1 and 2.

Comparative Example 4

Charging was conducted in the same manner as in Example 1 except that 552 g of sodium acetate was added, thereby conducting dehydration. As a result, 935.3 g of water and 1590.3 g of NMP were distilled off, and 0.31 mol of $H_2S$ was volatilized out. The available S content in the reactor after the dehydration step was 22.12 mol. The amount of $H_2S$ volatilized out corresponded to 1.38 mol % based on the charged S content. After the dehydration step, 3,300 g of [pDCB/available S=1.015 (mol/mol)] of pDCB and 3,738 g of NMP were added, and neither water nor NaOH was added, so that (total water content in the reactor/available S) was 1.22 (mol/mol), and (NaOH in the reactor/available S) was 1.041 (mol/mol).

Thereafter, in a polymerization step, a polymerization reaction was conducted at 220° C. for 2 hours and then at 260° C. for 5 hours. After completion of the polymerization, a polymer was collected in the same manner as in Example 1. The yield of the granular polymer thus obtained was 85%, and its melt viscosity was 130 Pa·s. The polymerization conditions and the measured results of physical properties are shown in Tables 1 and 2.

Comparative Example 5

Charging and dehydration were conducted in the same manner as in Example 1. As a result, 941.5 g of water and 1601.0 g of NMP were distilled off, and 0.31 mol of $H_2S$ was volatilized out. The available S content in the reactor after the dehydration step was 22.12 mol. The amount of $H_2S$ volatilized out corresponded to 1.38 mol % based on the charged S content. Since 3,300 g of [pDCB/available S=1.015 (mol/mol)] of pDCB and 3,749 g of NMP were added, and neither water nor NaOH was added, (total water content in the reactor/available S) was 1.20 (mol/mol), and (NaOH in the reactor/available S) was 1.041 (mol/mol).

Thereafter, in a polymerization step, a polymerization reaction was conducted at 220° C. for 2 hours and then at 260° C. for 5 hours. After completion of the polymerization, a polymer was collected by a flashing method while holding the reaction mixture at a temperature of 260° C. The polymer thus obtained was washed 5 times with water. The yield of the polymer was 95%, and its melt viscosity was 95 Pa·s. The polymerization conditions and the measured results of physical properties are shown in Tables 1 and 2.

TABLE 1

| | | Before dehydration | | First-stage polymerization | | | | | |
|---|---|---|---|---|---|---|---|---|---|
| | | NaOH/S mol/mol | NaOH/NaSH mol/mol | NMP/S kg/mol | pDCB/S mol/mol | $H_2O$/S mol/mol | NaOH in reactor/available S mol/mol | Temp. ° C. | Time hr |
| Example | 1 | 1.00 | 1.02 | 0.40 | 1.015 | 1.50 | 1.050 | 220-230 | 3.0 |
| | 2 | 0.96 | 0.98 | 0.40 | 1.015 | 1.50 | 1.020 | 220-230 | 3.0 |
| | 3 | 1.02 | 1.04 | 0.40 | 1.010 | 1.50 | 1.075 | 220-260 | 1.5 |
| Comp. Example | 1 | 0.83 | 0.85 | 0.40 | 1.015 | 1.50 | 0.900 | 220-230 | 3.0 |
| | 2 | 0.90 | 0.92 | 0.40 | 1.015 | 1.50 | 1.000 | 220-230 | 3.0 |
| | 3 | 1.02 | 1.04 | 0.40 | 1.015 | 1.50 | 1.100 | 220-230 | 3.0 |
| | 4 | 1.00 | 1.02 | 0.40 | 1.015 | 1.20 | 1.041 | 220-260 | 7.0 |
| | 5 | 1.00 | 1.02 | 0.40 | 1.015 | 1.20 | 1.041 | 220-260 | 7.0 |

TABLE 2

| | | Second-stage polymerization | | | Polymer | | | | | Comp'd. |
|---|---|---|---|---|---|---|---|---|---|---|
| | | $H_2O$/S mol/mol | Temp. ° C. | Time hr | Yield % | MV Pa·s | YI | Dimer* ppm | Reactivity with AS** | Volatile matter rank |
| Example | 1 | 2.80 | 260 | 5.0 | 90 | 145 | 5.8 | 13 | 2.5 | B |
| | 2 | 2.80 | 260 | 5.0 | 90 | 125 | 5.5 | 21 | 2.3 | B |
| | 3 | 2.80 | 260 | 5.0 | 88 | 110 | 6.0 | 25 | 2.2 | B |
| Comp. Example | 1 | 2.80 | 260 | 5.0 | Decomposed | — | — | — | — | — |
| | 2 | 2.80 | 260 | 5.0 | 90 | 90 | 6.0 | 50 | 1.3 | C |
| | 3 | 2.80 | 260 | 5.0 | 70 | 90 | 5.9 | 66 | 2.0 | C |
| | 4 | — | — | — | 85 | 130 | 9.0 | 85 | 1.8 | C |
| | 5 | — | — | — | 95 | 95 | 12.0 | 117 | 1.5 | D |

Note:
*Dimer: Bis(4-chlorophenyl)sulfide
**AS: Aminosilane(γ-aminopropyltriethoxysilane)

INDUSTRIAL APPLICABILITY

According to the present invention, there can be provided production processes of PASs, by which an alkali metal hydrosulfide and an alkali metal hydroxide can be used in combination as materials for a sulfur source to stably conduct a polymerization reaction, and polymers extremely low in the content of bis(4-chlorophenyl) sulfide that is an impurity secondarily produced upon the polymerization reaction, excellent in reactivity to silane coupling agents such as aminosilane, little in volatile matter in a compound and good in color tone can be provided.

According to the present invention, there can also be provided PASs low in the content of bis(4-chlorophenyl) sulfide. According to the present invention, there can further be provided PASs excellent in reactivity to silane coupling agents such as aminosilane.

The invention claimed is:

1. A process for producing a poly(arylene sulfide) by polymerizing a sulfur source and a dihalo-aromatic compound in an organic amide solvent in a reaction system, wherein the process uses reactants consisting essentially of alkali metal hydrosulfide, alkali metal hydroxide, and the dihalo-aromatic compound, in the organic amide solvent, which comprises the respective steps of:

(1) a dehydration step of heating and reacting a mixture in the system containing (i) the organic amide solvent, (ii) the alkali metal hydrosulfide as an aqueous mixture with water, and (iii) the alkali metal hydroxide as an aqueous mixture with water, the alkali metal hydroxide being employed in a proportion of 0.95 to 1.02 mol per mol of the alkali metal hydrosulfide, calculated on the basis of the content (analytical value) of the alkali metal hydrosulfide, to discharge at least a part of a distillate containing water from the interior of the system to the exterior of the system, wherein hydrogen sulfide formed upon the dehydration is discharged as a gas to the exterior of the system, wherein the discharge of hydrogen sulfide to the exterior of the system is directly linked with a weight loss of sulfur amount in the system, and wherein in the dehydration step, alkali metal hydroxide reacts with organic amide solvent and forms an alkali metal alkylaminoalkanoate, and alkali metal hydrosulfide forms a complex with the alkali metal alkylaminoalkanoate, (2) a charging step of adding an alkali metal hydroxide and water to the mixture remaining in the system after the dehydration step, as needed, to control the total number of moles of (i) an alkali metal hydroxide formed with hydrogen sulfide formed upon the dehydration, (ii) the alkali metal hydroxide added prior to the dehydration, and (iii) the alkali metal hydroxide added after the dehydration, and to control the number of moles of (iv) water, to provide 1.015 to 1.050 moles of (i)-(iii) per mol of a sulfur source (hereinafter referred to as "charged sulfur source") including the alkali metal hydrosulfide existing in the system after the dehydration and 0.5 to 2.0 moles of (iv) per mol of the charged sulfur source, wherein the amount of the charged sulfur source is calculated in accordance with an equation: [Charged sulfur source]= [Total moles of sulfur charged]−[Moles of sulfur volatized out after dehydration], (3) a first-stage polymerization step of adding a dihalo-aromatic compound to the mixture to subject the sulfur source and the dihalo-aromatic compound to a polymerization reaction at a temperature of 170 to 270° C., thereby forming a prepolymer with a conversion of the dihalo-aromatic compound of 50 to 98%, and (4) a second-stage polymerization step of controlling the amount of water in the reaction system after the first-stage polymerization step so as to bring about a state that water exists in a proportion of more than 2.0 mol, but up to 10 mol per mol of the charged sulfur source, and heating the reaction system to 245 to 290° C., thereby continuing the polymerization reaction, wherein the dehydration step and the subsequent polymerization steps are conducted in the same reaction vessel, and wherein at the completion of polymerization, a poly(arylene sulfide) having a bis(4-chlorophenyl) sulfide content lower than 30 ppm as determined by a gas chromatographic analysis, a melt viscosity value (MV1) of 30 to 500 Pa·s as measured at a temperature of 310° C. and a shear rate of 1,216 sec$^{-1}$, a ratio (MV2/MV1) of a melt viscosity value (MV2) of the poly(arylene sulfide) after a reaction with aminosilane to the melt viscosity value (MV1) before the reaction of 2.1 to 3.0 as measured at a temperature of 310° C. and a shear rate of 1,216 sec$^{-1}$, and a yellow index of at most 7 is provided.

2. The production process according to claim 1, wherein in the dehydration step, the mixture is heated to a temperature of 100 to 250° C.

3. The production process according to claim 1, wherein in the first-stage polymerization step, a prepolymer having a melt viscosity of 0.5 to 30 Pa·s as measured at a temperature of 310° C. and a shear rate of 1,216 sec$^{-1}$ is formed.

4. The production process according to claim 1, which further comprises, after the second-stage polymerization step, (5) a separation step of separating the polymer formed from a reaction mixture containing the polymer, and (6) a washing step of washing the polymer thus separated with an organic solvent.

5. The production process according to claim 4, wherein in the separation step, the polymer is separated from the reaction mixture by sieving.

6. The production process according to claim 4, wherein the organic solvent used in the washing step is acetone.

7. The production process according to claim 1, wherein the poly(arylene sulfide) has a melt viscosity value (MV1) of 125 to 500 Pa·s.

8. The production process according to claim 1, wherein the poly(arylene sulfide) has a bis(4-chlorophenyl) sulfide content not greater than 21 ppm as determined by gas chromatographic analysis.

* * * * *